(12) United States Patent
Gielda

(10) Patent No.: US 6,530,973 B2
(45) Date of Patent: Mar. 11, 2003

(54) AIR DESICCANT SYSTEM AND METHOD FOR AUTOMOTIVE CLIMATE CONTROL

(75) Inventor: Thomas P. Gielda, Brighton, MI (US)

(73) Assignee: Visteion Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/760,972

(22) Filed: Jan. 16, 2001

(65) Prior Publication Data

US 2002/0092419 A1 Jul. 18, 2002

(51) Int. Cl.[7] ............... B01D 53/02; B60H 3/00
(52) U.S. Cl. ............... 95/95; 95/107; 95/121; 96/109; 55/385.3
(58) Field of Search ............ 96/109, 121, 124, 96/125, 130, 150; 95/95, 96, 107, 113, 117, 121; 55/385.3; 454/121, 156

(56) References Cited

U.S. PATENT DOCUMENTS

| 5,514,035 A | * | 5/1996 | Denniston | ............... 55/385.3 |
| 5,526,872 A | | 6/1996 | Gielda et al. | |
| 5,626,185 A | | 5/1997 | Gielda et al. | |
| 5,667,560 A | * | 9/1997 | Dunne | ............... 96/125 |
| 5,725,639 A | * | 3/1998 | Khelifa et al. | ............... 55/385.3 |
| 5,878,590 A | * | 3/1999 | Kadle et al. | ............... 96/125 |
| 5,927,084 A | * | 7/1999 | Fielding | ............... 62/90 |
| 5,938,523 A | * | 8/1999 | Khelifa et al. | ............... 454/156 |
| 6,083,300 A | * | 7/2000 | McFadden | ............... 95/113 |
| 6,156,101 A | * | 12/2000 | Naheiri | ............... 95/101 |
| 6,290,758 B1 | * | 9/2001 | Mowat | ............... 96/126 |

FOREIGN PATENT DOCUMENTS

| JP | 09175164 A | * | 7/1997 |
| JP | 11344239 A | * | 12/1999 |

* cited by examiner

Primary Examiner—David A. Simmons
Assistant Examiner—Frank M. Lawrence
(74) Attorney, Agent, or Firm—Brinks Hofer Gilson & Lione

(57) ABSTRACT

A method and system for climate control uses a desiccant in an automobile. The desiccant removes humidity or moisture from air passing through the ventilation system. The desiccant is recharged or dried by application of a vacuum. The lower pressure generated by the vacuum reduces the temperature at which water evaporates or boils off of the desiccant material.

22 Claims, 2 Drawing Sheets

AIR DESICCANT SYSTEM AND METHOD FOR AUTOMOTIVE CLIMATE CONTROL

BACKGROUND

This invention relates to dehumidification in an enclosed area. In particular, a method and system for climate control using a desiccant in an automobile is provided.

Humidity in automobiles condenses on windows, impairing a vehicle operator's vision. For lower temperatures with high humidity, the typical ventilation system in an automobile may be incapable of effectively, efficiently or quickly removing the condensation. For example, air is recirculated from within a passenger compartment. Recirculating the air delays or prevents removal of the condensation from the window.

Desiccant systems have been developed for use in busses. Desiccants absorb a limited amount of moisture. Once the limited amount of moisture has been absorbed, the desiccant is dried or recharged by application of heat. The desiccant is exposed to exhaust gases from the engine. However, it is undesirable to route exhaust gases adjacent to the air duct or ventilation system of the bus. The proximity and connection between the exhaust gases and the air ducts for ventilation may allow leakage of exhaust into the passenger compartment. Furthermore, the exhaust gases can foul or otherwise deteriorate the desiccant material.

BRIEF SUMMARY

The present invention is defined by the following claims, and nothing in this section should be taken as a limitation on those claims. By way of introduction, the preferred embodiment described below includes a method and system for climate control using a desiccant in an automobile.

A desiccant removes humidity or moisture from air passing through the ventilation system. The desiccant is recharged or dried by application of a vacuum. The lower pressure generated by the vacuum reduces the temperature at which water evaporates or boils off of the desiccant material.

In one aspect, a method and system for climate control of a desiccant in an automobile are provided. A desiccant is exposed to air within an automobile. A vacuum source is operative to generate a low pressure area adjacent to at least a portion of the desiccant.

In another aspect, a system for climate control using a desiccant in an automobile is provided. The system includes an air duct and a vacuum chamber. A desiccant is positionable within the air duct and the vacuum chamber. An actuator operatively connects with the desiccant. The position of the desiccant relative to the air duct in the vacuum chamber is responsive to the actuator. A controller connects with the actuator.

Further aspects and advantages of the invention are discussed below in conjunction with the preferred embodiments.

DETAILED DESCRIPTION OF THE PREFERRED EMBODIMENTS

The embodiments discussed below use a vacuum or low pressure to recharge a desiccant. The humidity or moisture absorbed by the desiccant is removed by evaporation due to the low pressure. The desiccant is repetitively used to remove humidity or moisture from the air in the passenger compartment of an automobile. When air is recirculated within the passenger compartment through the ventilation system in high humidity and lower temperature environments, the desiccant removes humidity. The drier air within the passenger compartment does not allow formation of condensation on windows. The system also allows use of recirculating air for faster warming up of the vehicle during particularly low temperature environments. The system may decrease the load on an air conditioning system in a higher temperature environments.

Figure 1:
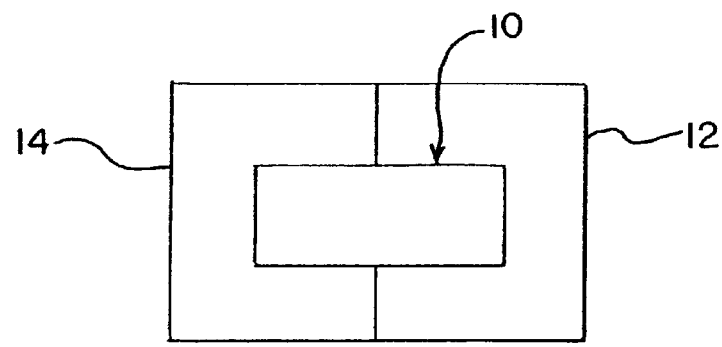
FIG. 1 is a diagram of one embodiment of a system for climate control using desiccant.

FIG. 1 shows one embodiment of a system for climate control using a desiccant. A desiccant 10 is provided in or adjacent to an air duct 12 and a vacuum chamber 14. The air duct 12 comprises a metallic, plastic or other tube or chamber of air. The air duct 12 is shaped as a tube, cylinder, rectangular or square shaped tube or any other geometric body for the transport of air. The air duct 12 may be of any of various sizes. The air duct 12 connects with a passenger compartment of an automobile in one embodiment. For example, the air duct 12 comprises a return air duct of an air handling case in an automobile. As yet another example, the air duct 12 comprises an air intake inlet or vent of the return air duct behind or below a dashboard of an automobile. In alternative embodiments, the air duct 12 connects with other chambers, compartments or bodies of air where reduced humidity is desired.

The desiccant 10 comprises a silica-based desiccant cartridge. In alternative embodiments, the desiccant comprises a zeolite, clay base or salt base desiccant. One to two pounds or other amounts of silica desiccant material are placed within a plastic or metallic cartridge allowing exposure of the desiccant 10 to air. The desiccant 10 is shaped in any of various shapes, such as a rectangular or circular volume. The desiccant 10 is sized such that it fits within or adjacent to the air duct 12, impeding none, a portion or the entire air duct 12.

Additional material may be provided with the desiccant 10. For example, activated carbon is incorporated within the desiccant material 10 or adjacent to the desiccant 10. Activated carbon reduces odors within the air traveling through or near the desiccant 10. Alternatively or additionally, a biocide, such as antifungal or antimold material, is included with or adjacent to the desiccant material 10. Other air purifying or conditioning materials may be used.

The vacuum chamber 14 comprises a vacuum source. The vacuum chamber 14 comprises a volume of various shapes and sizes, such as a generally rectangular volume sized to include at least a portion of the desiccant 10. The vacuum chamber 14 may be larger than the volume needed to house the desiccant material 10. The vacuum chamber 14 is formed from plastic, metal or other material able to withstand a lower pressure without collapse.

The vacuum chamber 14 has a low pressure. One or more of various mechanisms may be used for generating the low pressure. For example, the engine vacuum generated by an engine of an automobile is used to create the low pressure within the vacuum chamber 14. As another example, the Bernoulli affect is used to generate a vacuum within the vacuum chamber 14. The flow of fluid within the automobile is used to generate a suction, resulting in a vacuum. In one embodiment, a hose connects the vacuum chamber 14 to an engine coolant hose. The flow of engine coolant creates a suction within the vacuum chamber 14.

Water within the desiccant 10 in or adjacent to the vacuum chamber 14 is boiled or evaporated from the desiccant 10. The recharged desiccant 10 is exposed to air in the passenger compartment, allowing the recirculation of air within an automobile without excessive fogging on windows and reducing the load on an air conditioning system by removing latent heat from the air. The passive desiccant 10 reduces the power consumption of a climate control system within an interior of an automobile in high humidity environments.

As shown, the desiccant 10 is within both the vacuum chamber 14 and the air duct 12. In one embodiment, the desiccant 10 is moveable between or within each location. The desiccant 10 may be positioned adjacent to one or both the air duct 12 and the vacuum chamber 12. The desiccant 10 may be fixedly mounted in alternative embodiments.

Figure 2:
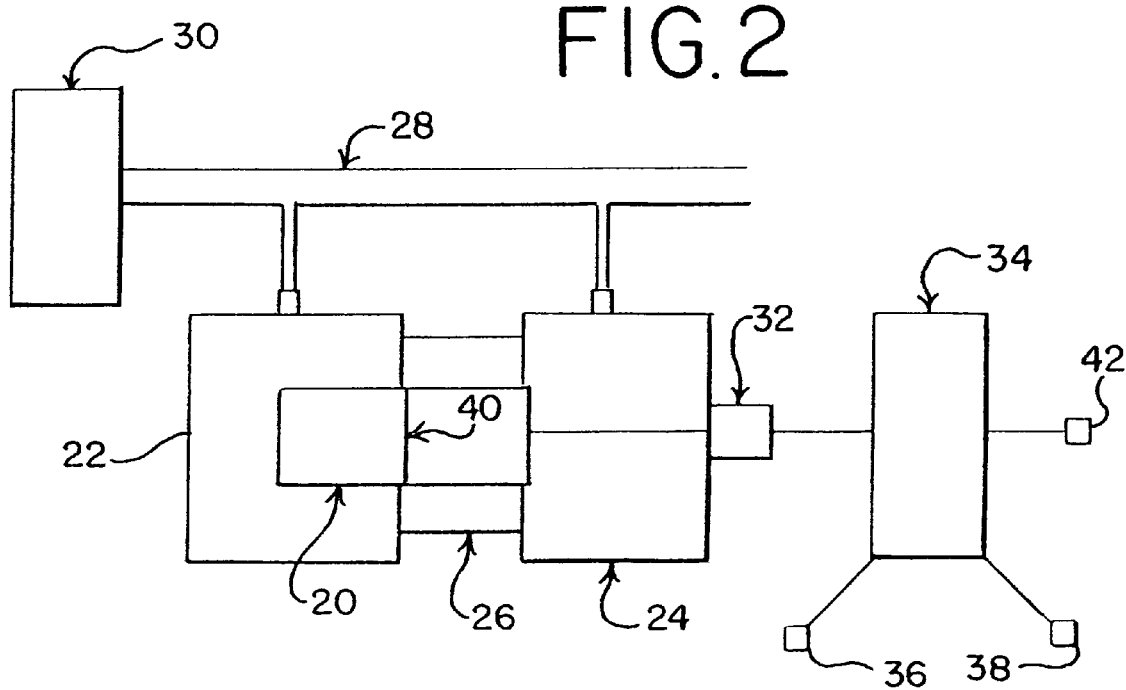
FIG. 2 is a diagram of another embodiment of a system for climate control using a desiccant.

FIG. 2 shows one embodiment of a system for climate control using a desiccant in an automobile. The system includes a desiccant cartridge 20, first and second vacuum chambers 22, 24, an air duct 26, a vacuum tube 28, a vacuum source 30, an actuator 32, a controller 34, a temperature sensor 36 and a humidity sensor 38. In response to control signals from the controller 34, the actuator 32 acts to move portions of the desiccant cartridge 20 into the air duct 26 and other portions into one of the vacuum chambers 22, 24. Continuous or substantially continuous removal of humidity from air within the air duct 26 is provided. The air duct 26, desiccant cartridge 20 and the vacuum chambers 22, 24 comprise the same or similar materials, shapes, and sizes discussed above with respect to FIG. 1.

The desiccant cartridge 20 is segmented. A wall or barrier 40 separates the desiccant cartridge 20 into at least two portions. The barrier 40 of one embodiment separates the desiccant cartridge 20 in half. The barrier 40 is positioned such that a seal or partial seal is provided to separate a portion of a desiccant cartridge 20 within a vacuum chamber 22, 24 from the portion of the desiccant cartridge 20 within the air duct 26. In the dual vacuum chamber embodiment shown in FIG. 2, the ends of the desiccant cartridge 20 are also shaped so as to provide a seal or partial seal between the vacuum chambers 22, 24 and the air duct 26. The desiccant cartridge 20 comprises a metal, plastic or other material in a web (i.e., screen) or partial web-partial enclosure for exposing desiccant to air.

The desiccant cartridge 20 is mounted within slots or apertures within the vacuum chambers 22 and 24. In one embodiment, rails or other guiding mechanisms are additionally provided to guide the desiccant cartridge 20 as it is positioned within the vacuum chambers 22, 24 and the air duct 26. Rollers may also be provided for positioning the desiccant cartridge 20.

Two vacuum chambers 22, 24 are provided so that while one portion of the desiccant cartridge 20 is within the air duct 26, the other portion is exposed to the low pressure within one of the vacuum chambers 22, 24. When the desiccant cartridge 20 is repositioned, the recharged portion of the desiccant cartridge 20 is exposed within the air duct 26 and the portion of the desiccant cartridge 20 storing more water is positioned in the associated vacuum chamber 22, 24. For example, a left or first half of a desiccant cartridge 20 is positionable within a first vacuum chamber 22 and the air duct 26. A right or second half of the desiccant cartridge 20 is positionable within the air duct 26 and a second vacuum chamber 24. The portion of the desiccant cartridge 20 exposed within the air duct 26 is switched from one portion to the other of the desiccant cartridge 20. In alternative embodiments, a wheel structure is used for the desiccant cartridge 20 and a single vacuum chamber 22, 24 are provided. The desiccant cartridge 20 is recharged by rotating the portion of the desiccant cartridge 20 exposed within the air duct 26 into the vacuum chamber 22. In other alternative embodiments, different structures and different numbers of associated vacuum chambers may be provided.

The vacuum source 30 is connected through the vacuum hose 28 to the vacuum chambers 22 and 24. The same or different sources of vacuum 30 may be used for each of the vacuum chambers 22, 24. In one embodiment, the vacuum source 30 comprises a fluid pump, such as provided in a coolant system. A portion of the vacuum hose 28 comprises a hose for carrying engine coolant. An additional hose is connected to the coolant hose for generating a suction with the Bernoulli effect for the vacuum chambers 22 and 24. For example, a T connection is used. In an alternative embodiment, the vacuum source 30 comprises an engine vacuum or an auxiliary belt or electric powered vacuum pump. For example, an auxiliary electrically powered vacuum pump is provided in the engine compartment of the automobile. The vacuum hose 28 communicates a suction or low pressure to the vacuum chambers 22, 24. In alternative embodiments, the vacuum source 30 connects directly to or is within the vacuum chambers 22, 24.

The vacuum hose 28 comprises a rubber, plastic, fiber, metal, combinations thereof or other material for transmitting liquid or gas, such as air, to generate suction.

Where the Bernoulli effect is used, a degasser or other device for removing air sucked into the flowing fluid to create the low pressure is preferably provided. For example, coolant systems within automobiles typically have a degasser.

The actuator 32 comprises an electric motor with a push rod assembly. The actuator 32 is electrically activated to move the rod and connected desiccant cartridge 20. Alternatively, an actuator with an associated gear, pulley or belt system is used for repositioning or switching the desiccant cartridge 20. The actuator 32 is positioned within or adjacent to a vacuum chamber 24, the air duct 26 or another location. The actuator 32 is positioned such that the desiccant cartridge 20 switchably recharges and exposes recharged desiccant within the air duct 26. The actuator 32 may alternatively directly connect with the cartridge 20. In alternative embodiments, hydraulic, vacuum operated, or non-electric actuator devices are used for positioning the desiccant cartridge 20.

A controller 34 controls operation of the actuator 32. The controller 34 comprises an application specific integrated circuit, a digital signal processor, an analog circuit, a general processor, combinations thereof or other device for receiving inputs and outputting control signals to the actuator 32. In one embodiment, the controller 34 comprises a multifunction processor used for other control within the automobile.

The controller 34 receives inputs from one or move devices. In one embodiment, the controller 34 receives inputs from the temperature sensor 36, the humidity sensor 38, and a recirculation control button 42. Different, additional, or fewer inputs may be provided. The temperature sensor 36, the humidity sensor 38, and the recirculation control button 42 comprise any one or more of various sensors or buttons used in automobiles for climate control or other purposes for the operation of the automobile. For example, the temperature and humidity sensors 32, 38 used for automatic climate control are also used as input to the controller 34 for operation of the actuator 32. The recirculation button 42 comprises a button, slide or other input device for the operator of the automobile to select recirculation of air within the ventilation system.

The controller 34 responds to the input from one or more devices, such as the temperature sensor 36, the humidity sensor 38, and the recirculation control button 42. In response to the inputs, the controller 34 causes the actuator 32 to reposition the desiccant cartridge 20. In one embodiment where the climate control system is set to recirculate air within the passenger compartment, the controller monitors the temperature and humidity from the temperature sensor 36 and humidity sensor 38. Where a threshold level of humidity and a threshold lower temperature is detected, the controller 34 causes the actuator to position a recharged portion of the desiccant cartridge 20 within or adjacent to the air duct 26. The controller 34 then periodically repositions the desiccant cartridge 20 or, after a predetermined time, monitors the environment as discussed above until another reposition is triggered.

Repositioning of the desiccant cartridge 20 after a time or periodically continues until the climate control system is removed from a recirculation mode, the temperature exceeds a threshold, the humidity 38 becomes sufficiently low, an air conditioning compressor turns on, another event occurs or combinations thereof. Depending on the desiccant, an amount of water vapor that is about 20–50% of the dry weight of the desiccant may be absorbed. For example, two to three hours are used to absorb water vapor after one reposition of the desiccant cartridge 20. It is estimated that one hour is needed for recharging, but this time may differ as a function of various factors including the amount of vacuum.

In other embodiments, the controller 34 also controls the vacuum source 30. For example, the controller 34 turns the vacuum source 30 on or off in conjunction with actuation of the actuator 32 and continued periodic actuation. In yet other alternative embodiments, the controller 34 operates valves or switches to control the supply of low pressure to the vacuum chambers 22 and 24.

Figure 3:
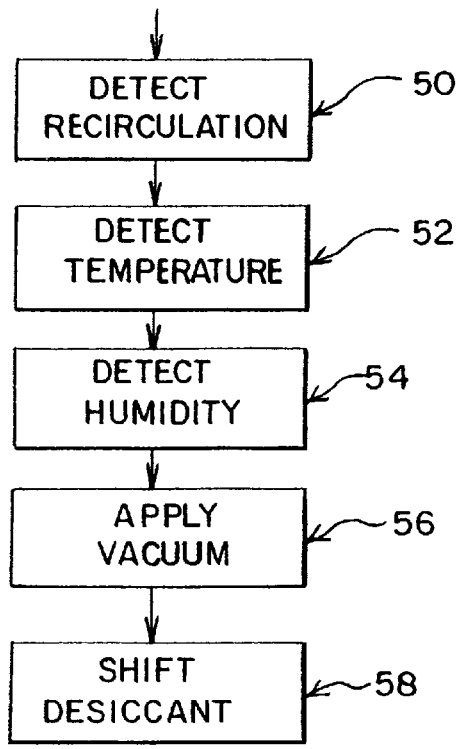
FIG. 3 is a flow chart diagram representing one embodiment of the operation of the system of FIG. 2.

FIG. 3 shows a flow chart of one embodiment representing the operation of the climate control system of FIG. 2. The flow chart represents one embodiment for exposing a desiccant to air within the passenger compartment and a generating a low pressure to remove liquid from the desiccant. In act 50, selection of a recirculation setting is detected. In act 52, a temperature within the passenger is detected. In act 54, the humidity within the passenger compartment is detected. In alternative embodiments, any one or more of act 50, 52, or 54 may be skipped. In response to activation of the recirculation setting, a range of temperatures and range of humidities, a vacuum is applied to the desiccant material. In act 56, application of the low pressure by activating a pump, generating a Bernoulli effect, or positioning a portion of a desiccant material within a vacuum chamber removes liquid from the desiccant material. To further remove humidity from air within the passenger compartment, the desiccant material is shifted to expose recharged desiccant within the air in communication with the passenger compartment in act 58. For example, silica desiccant material is exposed to air within an air duct while another portion of a desiccant material is exposed to a low pressure vacuum. Other filtering may be provided in act 58, such as providing for carbon activated filtering. Periodically as a function of time, detected environmental conditions, or other inputs, the desiccant material is shifted in act 58 so that recharged desiccant is exposed to air associated with the passenger compartment and other portions of the desiccant material are exposed to a low pressure for recharging the desiccant.

Figure 4:
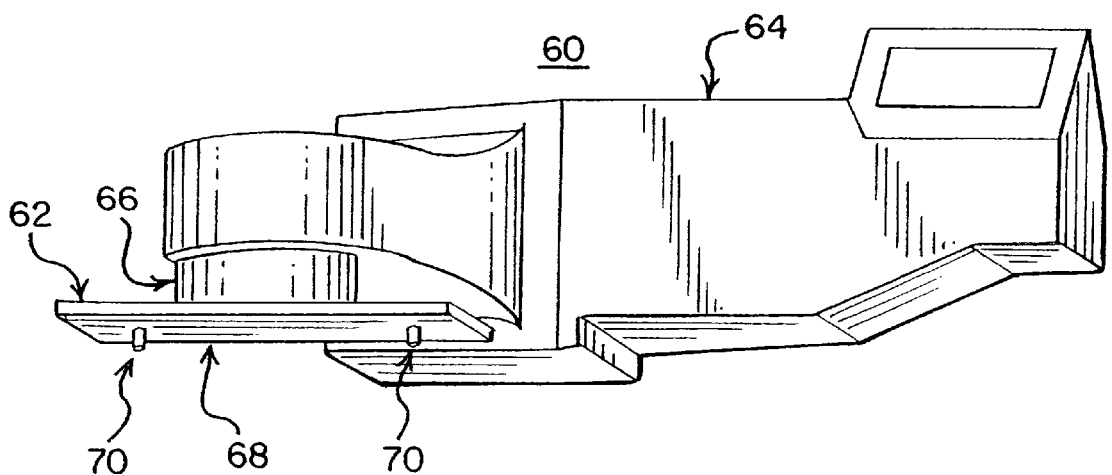
FIG. 4 is a perspective view of a system for climate control using a desiccant of yet another embodiment.

FIG. 4 is a perspective view of another embodiment of the climate control system 60. The climate control system includes a desiccant system 62 and an air handling unit 64. The air handling unit 64 is adapted for mounting behind a dash board of an automobile. The air handling unit 64 provides heated, cooled and/or filtered air to the passenger compartment.

The air handling unit includes an inlet duct or vent 66. The inlet vent 66 is adapted for drawing air from the passenger compartment in to the air handling unit 64.

The desiccant system 62 connects to the inlet vent 66. In one embodiment, the desiccant system 62 covers the inlet vent 66. The desiccant system 62 comprises a housing 68 and two nipples 70. The housing 68 comprises metal, plastic, other materials or combinations thereof The housing 68 contains two vacuum chambers and an air flow or air duct section as described above with reference to FIG. 2. The air flow section allows air to pass from the passenger compartment, through the housing 68 and into the inlet vent 66.

In the embodiment shown, each vacuum chamber is associated with one of the nipples 70. The vacuum from the vacuum source is provided through the nipples 70. The desiccant is about ⅔ the length of the housing 68. The desiccant slides between 1) exposing a first half in the air flow section and placing a second half in one of the vacuum chambers and 2) exposing the second half in the air flow section and placing the first half in the other vacuum chamber.

While the invention has been described above by reference to various embodiments, it will be understood that many changes and modifications can be made without departing from the scope of the invention. For example, any of various sources of vacuum and desiccant materials may be used, whether now known or later developed. Additionally, different relative sizes and shapes of various components of the climate control system may be used.

It is therefore intended that the foregoing detailed descriptions be understood as an illustration of the presently preferred embodiments of the invention, and not as a definition of the invention. It is only the following claims, including all equivalents, that are intended to define the scope of this invention.

What is claimed is:

1. A system for climate control using desiccant in an automobile, the system comprising:

a desiccant exposed to air within an automobile;

a vacuum source operative to generate a low pressure area adjacent at least a portion of the desiccant;

a chamber connected with the vacuum source, the portion of the desiccant including opposite sides of the desiccant both being in the chamber and both subjected to the low pressure area at a same time; and an actuator connected with the desiccant, the actuator operable to move the desiccant relative to the air and the chamber.

2. The system of claim 1 further comprising an air duct operatively connected with an automobile passenger compartment wherein the desiccant is exposed to air within the air duct.

3. The system of claim 1 wherein the vacuum source comprises a vacuum pump associated with an engine of the automobile.

4. The system of claim 1 wherein the vacuum source comprises suction responsive to flowing liquid.

5. The system of claim 4 wherein the flowing liquid comprises engine coolant.

6. The system of claim 1 wherein the desiccant comprises a cartridge of silica gel.

7. The system of claim 1 further comprising an activated carbon filter adjacent the desiccant.

8. The system of claim 1 wherein the desiccant comprises a segmented desiccant cartridge.

9. The system of claim 8 wherein a first segment of the segmented desiccant cartridge is exposed to an airstream and a second segment of the segmented desiccant cartridge is exposed to the vacuum source.

10. The system of claim 9 an wherein the actuator is operable to reverse the exposure of the first and second segments.

11. A method for climate control with a desiccant in an automobile, the method comprising:

(a) exposing a desiccant to air within a passenger compartment of an automobile;

(b) generating a low pressure area adjacent at least a portion of the desiccant, the low pressure sufficient to lower a boiling or evaporation temperature of water from the desiccant, the low pressure relative to the air;

(c) moving the desiccant relative to the air and the low pressure area.

12. The method of claim 11 wherein (a) comprises exposing the desiccant within an air duct.

13. The method of claim 11 wherein (b) comprises generating the low pressure area with a vacuum pump.

14. The method of claim 11 wherein (b) comprises generating the low pressure area with fluid flow.

15. The method of claim 14 wherein (b) comprises generating the low pressure area with engine coolant.

16. The method of claim 11 wherein (a) comprises exposing silica gel.

17. The method of claim 11 further comprising:

(d) removing humidity from the air in response to (a).

18. The method of claim 11 further comprising:

(d) filtering the air with an activated carbon filter.

19. The method of claim 11 wherein the desiccant comprises a segmented desiccant cartridge and (a) comprises exposing a first segment of the segmented desiccant cartridge;

further comprising (d) exposing a second segment of the segmented desiccant cartridge to the low pressure area.

20. The method of claim 11 wherein (c) comprises switchably positioning a first portion of the desiccant to be exposed pursuant to (a) and a second portion to be exposed to the low pressure area.

21. A system for climate control using desiccant in an automobile, the system comprising:

an air duct;

a vacuum chamber;

a desiccant positionable within the air duct and the vacuum chamber;

an actuator operatively connected with the desiccant, the position of the desiccant relative to the air duct and the vacuum chamber responsive to the actuator; and a controller connected with the actuator;

wherein the vacuum chamber is operable to remove moisture from the desiccant.

22. A system for climate control using desiccant in an automobile, the system comprising:

a desiccant exposed to air within an automobile;

a chamber operative to contain a low pressure area adjacent at least a portion of the desiccant; and a hose connected with the chamber, the hose operable to generate the low pressure in response to flowing liquid.

* * * * *

UNITED STATES PATENT AND TRADEMARK OFFICE
CERTIFICATE OF CORRECTION

PATENT NO.    : 6,530,973 B2
DATED         : March 11, 2003
INVENTOR(S)   : Thomas P. Gielda It is certified that error appears in the above-identified patent and that said Letters Patent is hereby corrected as shown below:

<u>Title page,</u>
Item [73], delete "Visteion" and substitute -- Visteon -- in its place.

Signed and Sealed this

Twenty-second Day of July, 2003

JAMES E. ROGAN
*Director of the United States Patent and Trademark Office*